US011980935B2

(12) United States Patent
Akizawa et al.

(10) Patent No.: US 11,980,935 B2
(45) Date of Patent: May 14, 2024

(54) COPPER PARTICLES AND METHOD FOR PRODUCING SAME

(71) Applicant: Mitsui Mining & Smelting Co., Ltd., Tokyo (JP)

(72) Inventors: Mizuki Akizawa, Shimonoseki (JP); Takafumi Sasaki, Shimonoseki (JP)

(73) Assignee: Mitsui Mining & Smelting Co., Ltd. (JP)

( * ) Notice: Subject to any disclaimer, the term of this patent is extended or adjusted under 35 U.S.C. 154(b) by 0 days.

(21) Appl. No.: 17/911,511

(22) PCT Filed: Dec. 15, 2020

(86) PCT No.: PCT/JP2020/046651
§ 371 (c)(1),
(2) Date: Sep. 14, 2022

(87) PCT Pub. No.: WO2021/199512
PCT Pub. Date: Oct. 7, 2021

(65) Prior Publication Data

US 2023/0107436 A1 Apr. 6, 2023

(30) Foreign Application Priority Data

Mar. 31, 2020 (JP) ................................ 2020-062134

(51) Int. Cl.
*B22F 1/05* (2022.01)
*B22F 1/00* (2022.01)
(Continued)

(52) U.S. Cl.
CPC ................. *B22F 1/00* (2013.01); *B22F 1/05* (2022.01); *B22F 1/16* (2022.01); *H01B 1/026* (2013.01);
(Continued)

(58) Field of Classification Search
CPC .... H01B 1/00; H01B 1/22; H01B 5/14; B22F 1/05; B22F 1/16
See application file for complete search history.

(56) References Cited

U.S. PATENT DOCUMENTS 4,499,010 A * 2/1985 Tanino .................... C09D 5/24 524/440
10,910,340 B1 * 2/2021 Chew ..................... H01L 24/29
(Continued)

FOREIGN PATENT DOCUMENTS

JP H10-183207 A 7/1998
JP 2002-332502 A 11/2002
(Continued)

OTHER PUBLICATIONS

Sze Kee Tam et al "High-concentration copper nanoparticles synthesis process for screen-printing conductive paste on flexible substrate", J Nanopart Res (2015) 17:466.*
International Search Report (English and Japanese) issued in PCT/JP2020/046651, dated Jan. 19, 2021; ISA/JP (6 pages).

*Primary Examiner* — Mark Kopec
(74) *Attorney, Agent, or Firm* — Harness, Dickey & Pierce, P.L.C.

(57) ABSTRACT

Copper particles are provided that each include a core particle made of copper and a coating layer that coats the surface of the core particle, wherein the coating layer is made of a copper salt of an aliphatic organic acid. It is also preferable that the copper particles have an infrared absorption peak in a range of 1504 to 1514 $cm^{-1}$ and no infrared absorption peak in a range of 1584 to 1596 $cm^{-1}$. It is also preferable that, in thermogravimetric analysis of the copper particles, the temperature at which the ratio of the mass loss value to the mass loss value at 500° C. reaches 10% is from 150° C. to 220° C. A method is also provided for producing copper particles, the method including bringing core par-
(Continued)

ticles made of copper into contact with a solution containing a copper salt of an aliphatic organic acid to thereby coat the surface of the core particles.

12 Claims, 1 Drawing Sheet

(51) Int. Cl.

| | |
|---|---|
| ***B22F 1/16*** | (2022.01) |
| ***H01B 1/02*** | (2006.01) |
| ***H01B 1/22*** | (2006.01) |
| ***H01B 5/14*** | (2006.01) |

(52) U.S. Cl.
CPC ............ *H01B 5/14* (2013.01); *B22F 2301/10* (2013.01); *B22F 2304/10* (2013.01)

(56) References Cited

U.S. PATENT DOCUMENTS

| | | | | |
|---|---|---|---|---|
| 2013/0068373 | A1* | 3/2013 | Schafer | H01L 24/83 106/287.18 |
| 2017/0221855 | A1* | 8/2017 | Nachreiner | B22F 1/10 |
| 2018/0147673 | A1* | 5/2018 | Schmitt | B22F 1/0003 |

FOREIGN PATENT DOCUMENTS

| | | | |
|---|---|---|---|
| JP | 2014-148732 | A | 8/2014 |
| JP | 2015-168878 | A | 9/2015 |
| JP | 2017-089000 | A | 5/2017 |
| JP | 2017-519897 | A | 7/2017 |
| JP | 2019-065363 | A | 4/2019 |
| WO | 2010-032841 | A1 | 3/2010 |

* cited by examiner

COPPER PARTICLES AND METHOD FOR PRODUCING SAME

CROSS REFERENCE TO RELATED APPLICATIONS

This application is a U.S. National Phase Application under 35 U.S.C. 371 of International Application No. PCT/JP2020/046651, filed on Dec. 15, 2020, which claims priority to Japanese Patent Application No. 2020-062134, filed on Mar. 31, 2020. The entire disclosures of the above applications are expressly incorporated by reference herein

BACKGROUND

Technical Field

The present invention relates to copper particles. The copper particles of the present invention are useful as, for example, a raw material of a conductive composition and a raw material of a sintered material.

Related Art

The applicant of the present invention has previously proposed a technology related to a surface-treated copper powder for copper paste, the copper powder including a surface-treated layer treated using a fatty acid (see JP 2002-332502A). This copper powder has a low paste viscosity, exhibits very little change over time in the viscosity, and therefore has the advantage of making quality control very easy.

Also, the applicant of the present invention has proposed a technology related to copper particles in which primary particles have an average particle size from 0.1 to 0.6 μm, a surface treatment agent is applied to the particle surface, and the ratio of the surface treatment agent to the particles to which the surface treatment agent is applied is from 0.25 to 5.50 mass % in terms of carbon atoms (see JP 2015-168878A). In this technology, a fatty acid or an aliphatic amine that has 6 to 18 carbon atoms is suitably used as the surface treatment agent. This technology has the advantage of achieving favorable sinterability of copper particles at low temperatures.

With the technologies disclosed in JP 2002-332502A and JP 2015-168878A above, it is possible to form a highly conductive conductor film by applying a composition, such as a paste or an ink, containing the copper particles and an organic solvent to a substrate and firing the thus formed coating film. However, firing of the copper particles coated with the surface treatment agent, such as a fatty acid or an aliphatic amine, may be performed under high-temperature conditions to remove organic matter from the surface treatment agent. In this regard, there is room for improvement in order to achieve sintering at even lower temperatures.

Therefore, an object of the present invention is to improve conventional technologies and more particularly to provide copper particles that can be sintered at an even lower temperature.

SUMMARY

The inventors of the present invention have conducted in-depth studies to achieve the above-described object, and found that the object of the present invention can be achieved by using a copper salt of an aliphatic organic acid as a treatment agent that coats the surface of copper particles.

That is to say, the present invention provides copper particles each including a core particle made of copper and a coating layer that coats a surface of the core particle, wherein the coating layer comprises a surface treatment agent containing a copper salt of an aliphatic organic acid.

Also, the present invention provides a method for producing copper particles, the method including bringing core particles made of copper into contact with a solution containing a copper salt of an aliphatic organic acid to thereby coat a surface of the core particles.

DETAILED DESCRIPTION

Figure 1:
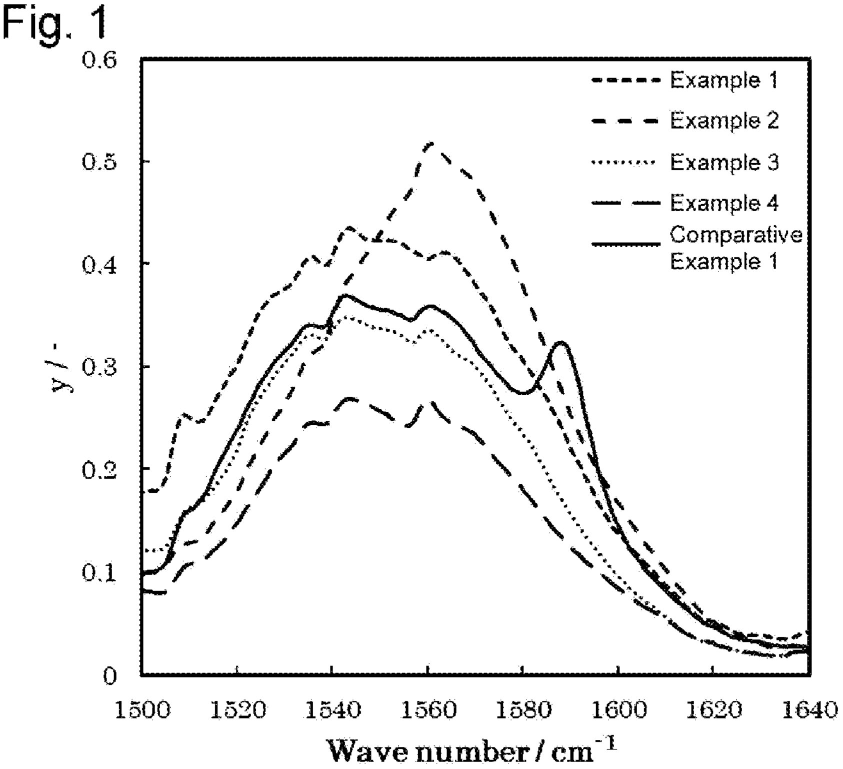
FIG. 1 shows normalized IR spectra of copper particles of examples and a comparative example.

Hereinafter, the present invention will be described based on preferred embodiments thereof. In copper particles of the present invention, a surface treatment agent containing a copper salt of an aliphatic organic acid is applied to the surface of the particles. Thus, a coating layer made of the surface treatment agent is formed covering continuously or discontinuously the surface of core particles made of copper. The surface treatment agent is used to suppress both oxidation of copper and aggregation of particles.

As described above, the surface treatment agent used in the present invention contains a copper salt of an aliphatic organic acid.

In the present technical field, a surface treatment agent, such as a fatty acid or an aliphatic amine, has been used to suppress both the oxidation of copper of copper particles and the aggregation of the particles. However, such a treatment agent has a high decomposition temperature, and there are cases where the treatment agent cannot be sufficiently removed during sintering of the copper particles. This may lead to an increase in the sintering start temperature and an increase in the resistance of a conductor film obtained after the copper particles have been sintered together. The inventors of the present invention have conducted in-depth studies to address this problem, and found that the use of a copper salt of an aliphatic organic acid as the surface treatment agent can lower the sintering start temperature while suppressing both the oxidation of copper and the aggregation of particles, and can consequently lower the resistance of the conductor film obtained after the sintering while improving low-temperature sinterability of the particles. Furthermore, it was also found that, as a result of the improvement in the low-temperature sinterability, even when the conductor film is formed on a resin sheet, the adhesion between the resin and the conductor film is improved.

From the viewpoint of suppressing both the oxidation of copper and the aggregation of particles while improving the low-temperature sinterability of copper particles to be obtained, the aliphatic organic acid constituting the copper salt of the aliphatic organic acid has preferably 6 to 18 carbon atoms, more preferably 8 to 18 carbon atoms, even more preferably 10 to 18 carbon atoms, and yet even more preferably 12 to 18 carbon atoms. Examples of such aliphatic organic acid include a linear or branched saturated or unsaturated carboxylic acid, a sulfonic acid having a linear or branched saturated or unsaturated hydrocarbon group, and the like, and a linear saturated or unsaturated carboxylic acid is preferably used. Also, copper of the copper salt of the aliphatic organic acid has a valency of 1 or 2, and preferably 2.

Specific examples of the carboxylic acid include citric acid, hexanoic acid, heptanoic acid, octanoic acid, nonanoic acid, decanoic acid, lauric acid, palmitic acid, oleic acid, stearic acid, and the like. Lauric acid, oleic acid, and stearic acid are preferable, and lauric acid and stearic acid are more preferable.

Specific examples of the sulfonic acid include hexane sulfonic acid, heptane sulfonic acid, octane sulfonic acid, nonane sulfonic acid, decane sulfonic acid, lauric sulfonic acid, palmitic sulfonic acid, oleic sulfonic acid, stearic sulfonic acid, and the like. One of these aliphatic organic acids may be used alone, or two or more thereof may be used in combination.

The surface treatment agent can be applied to the particle surface, for example, in a step after core particles made of copper have been produced, by bringing the obtained core particles into contact with the copper salt of the aliphatic organic acid, which is the surface treatment agent. The amount of the surface treatment agent applied is, when expressed as the ratio (mass %) of the entire surface treatment agent to the copper particles to which the surface treatment agent is applied, preferably from 0.2 to 2.0 mass %, and more preferably from 0.3 to 1.0 mass %, in terms of carbon atoms. When the amount of the surface treatment agent applied is in the above-described range, the melting temperature of the copper particles can be lowered by the effects of removal of an oxide film on the surface of the copper particles by the surface treatment agent and co-melting, and consequently the low-temperature sinterability can be improved.

The ratio (mass %) of the surface treatment agent applied to the surface of the copper particles can be determined in the following manner: 0.5 g of copper powder that is a collection of the copper particles to which the surface treatment agent is applied is heated in an oxygen stream in a carbon and sulfur analyzer (EMIA-320V, manufactured by HORIBA, Ltd.) to decompose the carbon component in the copper powder into CO or $CO_2$, and the amount of CO or $CO_2$ is determined.

Qualitative and quantitative analysis of the surface treatment agent can be performed using methods, for example, a nuclear magnetic resonance (NMR) method, Raman spectroscopy, infrared spectroscopy, liquid chromatography, time-of-flight secondary ion mass spectrometry (TOF-SIMS), and the like alone or in combination.

The copper particles of the present invention has, on the surface of the core particles, the coating layer that is formed using the copper salt of the aliphatic organic acid as the surface treatment agent. Whether or not the coating layer has been formed using the copper salt of the aliphatic organic acid can be identified using the following method, for example. More specifically, copper particles are mixed in a mortar with KBr such that the mass of the copper particles is 5 mass % to prepare a measurement sample, which in turn is measured by a diffuse reflection method using an infrared spectrophotometer (model No.: FT-IR4600) manufactured by JASCO Corporation under the conditions of a resolution of 4 $cm^{-1}$ and an integration frequency of 128 times, to thereby obtain a graph (spectrum) with the Kubelka-Munk transformed absorbance on the vertical axis and the wave number (500 to 4000 $cm^{-1}$) on the horizontal axis. At this time, if an infrared absorption peak is observed in a range of 1504 to 1514 $cm^{-1}$, and no infrared absorption peak is observed in a range of 1584 to 1596 $cm^{-1}$, the coating layer can be identified to have been formed using the copper salt of the aliphatic organic acid. In other words, it is preferable that, when measured by infrared spectroscopy, the copper particles of the present invention have an infrared absorption peak observed in the range of 1504 to 1514 $cm^{-1}$ and no infrared absorption peak observed in the range of 1584 to 1596 $cm^{-1}$.

"Having an infrared absorption peak" is defined in the following manner. First, IR spectral data normalized by the maximum value of a peak observed in a range of 2910 to 2940 $cm^{-1}$ is differentiated twice, and waveform separation is performed in a range of 1500 to 1600 $cm^{-1}$ based on a zero up-crossing method. Subsequently, the arithmetic mean value is calculated from the absolute values of the amplitude from a reference line (zero) of separated waveforms. If the absolute value of the peak height is greater than half of the arithmetic mean value, the copper particles are regarded as "having an infrared absorption peak".

Note that, in the case of copper particles in which a fatty acid or an aliphatic amine is used as a surface treatment agent, an infrared absorption peak is detected in the range of 1584 to 1596 $cm^{-1}$, as shown in Examples, which will be described later, and such copper particles can thus be distinguished from the copper particles of the present invention in this respect.

Although it is not clear why the use of a copper salt of an aliphatic organic acid makes it possible to obtain copper particles with good low-temperature sinterability while suppressing both the oxidation of copper and the aggregation of particles, the inventors of the present invention presume that the reason is as follows.

As described above, the copper particles of the present invention and copper particles in which a fatty acid or an aliphatic amine is used as a surface treatment agent differ from each other in the presence or absence of an infrared absorption peak at a specific wave number.

Infrared spectroscopy is based on the measurement principle of measuring the absorption of light energy corresponding to the kinetic energy of bonds in a molecule by irradiating a substance or molecule to be measured with infrared radiation. In general, if infrared absorption is observed in infrared spectroscopy, it indicates the presence of a certain bond in a molecule. In particular, if infrared absorption is observed at a high wave number position, it can be said that a bond with high binding energy is present in a molecule because infrared radiation with a high wave number has high energy.

A comparison between the copper particles of the present invention and copper particles in which a fatty acid or an aliphatic amine is used as a surface treatment agent shows that, for both types of copper particles, infrared absorption is observed in a low wave number region in the range of 1504 to 1514 $cm^{-1}$, and therefore, it is presumable that absorption in this region means the presence of a coating layer bonded to the core particle surface. It is conceivable that both the oxidation of copper in the core particles and the aggregation of particles can thus be suppressed.

On the other hand, when a high wave number region in the range of 1584 to 1596 $cm^{-1}$ is focused on, infrared absorption of the former copper particles is not observed in this high wave number region, whereas infrared absorption of the latter copper particles is observed in this high wave number region. This means that, when compared with copper particles in which a fatty acid or an aliphatic amine is used as a surface treatment agent, the copper particles of the present invention have less bonds with high binding energy in a molecule. This can be interpreted to indicate that, in the copper particles of the present invention, the bond between the surface treatment agent and the core particles is relatively weak, and it is therefore conceivable that the surface treatment agent is easily desorbed at a low temperature, enabling the particles to be sintered together at a low temperature.

For the reasons described above, it is conceivable that, with the copper particles of the present invention, it is possible to improve the low-temperature sinterability while suppressing both the oxidation of copper and the aggregation of particles.

Furthermore, with respect to the copper particles of the present invention, in order to identify which organic acid is the aliphatic organic acid constituting the copper salt of the aliphatic organic acid, an analysis can be performed by TOF-SIMS, for example.

From the viewpoint of improving the low-temperature sinterability of the copper particles even more, in a thermogravimetric analysis when the copper particles are heated from 25° C. to 1000° C., the temperature at which the ratio of the mass loss value to the mass loss value at 500° C. reaches 10% is preferably from 150° C. to 220° C., and more preferably from 180° C. to 220° C.

The above-described thermogravimetric analysis can be performed in the following manner, for example. That is, with use of TG-DTA2000SA manufactured by Bruker AXS, the mass loss ratio when 50 mg of a measurement sample is heated from 25° C. to 1000° C. is measured. The atmosphere is nitrogen, and the temperature increase rate is 10° C./min. The temperature at which the mass loss ratio reaches a predetermined ratio can be used as an indicator of the low-temperature sinterability of the copper particles, because the lower this temperature, the lower the temperature at which the aliphatic organic acid that forms the coating layer can be removed.

From the viewpoint of improving both the sinterability of the copper particles at low temperatures and the conductivity of the conductor film obtained by sintering the particles, the average particle size of primary particles of the copper particles to which the surface treatment agent is applied is preferably from 0.05 to 1.0 μm, and more preferably from 0.1 to 0.5 μm. As used herein, the term "primary particle" means an object that is regarded as the smallest unit of particles when identified from its external geometrical form.

The average particle size of primary particles can be obtained by observing the copper particles using, for example, a scanning electron microscope (JSM-6330F, manufactured by JEOL Ltd.) at a magnification of 10000 times or 30000 times, measuring the Ferret diameter in the horizontal direction with respect to 200 particles in the visual field, and calculating a sphere-equivalent volume average particle size from the measured values.

As described above, in the copper particles of the present invention, a surface-treated layer made of the surface treatment agent is formed covering the core particles made of copper. Preferably, the core particles are made only of copper and residual unavoidable impurities.

Furthermore, from the viewpoint of increasing the dispersibility of particles and thus obtaining a highly conductive conductor film, the shape of the copper particles is preferably spherical. In order to obtain spherical copper particles, for example, spherical core particles can be used. Note that "spherical particles" refers to particles having a circularity coefficient of preferably 0.85 or greater, and more preferably 0.90 or greater, as measured using the following method. The circularity coefficient is calculated using the following method. A scanning electron microscope image of metal particles is captured, and 1000 particles that do not overlap each other are randomly chosen. When the area of a two-dimensional projected image of a particle is S, and the perimeter of the particle is L, the circularity coefficient of the particle is calculated from an equation $4\pi S/L^2$. The arithmetic mean value of the circularity coefficients of the individual particles is used as the above-described circularity coefficient. If the two-dimensional projected image of a particle is a perfect circle, the circularity coefficient of the particle is 1.

Hereinafter, a preferred method for producing the copper particles of the present invention will be described. The present production method includes bringing core particles made of copper into contact with a solution containing a copper salt of an aliphatic organic acid to thereby form a coating layer that coats the surface of the core particles.

First, core particles made of copper are prepared prior to surface treatment with the copper salt of the aliphatic organic acid. As the method for producing core particles made of copper, core particles can be produced using, for example, a wet method disclosed in JP 2015-168878A. That is to say, a reaction liquid containing a monovalent or divalent copper source, such as copper chloride, copper acetate, copper hydroxide, copper sulfate, copper oxide, or cuprous oxide, in a liquid medium containing water and preferably a monohydric alcohol having 1 to 5 carbon atoms is prepared. This reaction liquid is mixed with hydrazine at a ratio preferably from 0.5 to 50 mol with respect to 1 mol of copper, and the copper source is reduced, to obtain core particles made of copper. The core particles obtained using this method do not have a surface treatment agent, such as a copper salt of an aliphatic organic acid, applied to the surface thereof, and have a small particle size.

Preferably, the core particles obtained through the above-described process are washed. Examples of the washing method include decantation, rotary filtering, and the like. In the case where the core particles are washed by rotary filtering, for example, an aqueous slurry in which the core particles are dispersed in a solvent such as water is prepared, and washing is performed until the conductivity of the slurry reaches, preferably, 2.0 mS or less. In this case, the washing conditions can be set as follows: when, for example, water is used as a washing solvent, the washing temperature is from 15° C. to 30° C., and the washing time is from 10 to 60 minutes. The conductivity of the slurry in the above-described range enables surface treatment, which will be described later, to be performed with high efficiency while the core particles to be washed remain uniformly dispersed without aggregating. The content of the core particles made of copper in this slurry is preferably from 5 to 50 mass %, from the viewpoint of improving both the washing efficiency and the dispersibility of the particles.

Alternatively, instead of the above-described method, for example, a direct current thermal plasma (DC plasma) method disclosed in WO 2015/122251 may be used as another method for producing core particles made of copper. More specifically, core particles can be generated from a copper matrix powder by subjecting the matrix powder to the direct current thermal plasma method, which is a type of PVD. The core particles obtained using this method also do not have a surface treatment agent, such as a copper salt of an aliphatic organic acid, applied to the surface thereof, and have a small particle size. If necessary, the obtained core particles may be crushed or classified to separate or remove coarse particles and microparticles.

Next, the core particles obtained using the above-described method is surface-treated with the surface treatment agent to form a coating layer that coats the surface of the core particles. As the surface treatment method, for example, a method can be used in which the core particles are brought into contact with a solution in which the copper salt of the aliphatic organic acid is dissolved in a solvent. The core particles that are brought into contact with the copper salt of the aliphatic organic acid in this step may be in the form of an aqueous slurry in which the core particles are dispersed in a solvent such as water, or may be in a dry state without being dispersed in a solvent or the like. With regard to the order of contact in this step, one of the core particles and the solution of the copper salt of the aliphatic organic acid may be added to the other, or the core particles and the solution of the copper salt of the aliphatic organic acid may be brought into contact at the same time.

In order for the core particles to be uniformly surface-treated with the copper salt of the aliphatic organic acid, it is preferable to use a method in which a solution of the copper salt of the aliphatic organic acid is added to a slurry in which the core particles are dispersed.

Hereinafter, a method in which surface treatment is performed by adding the core particles to a solution of the copper salt of the aliphatic organic acid will be described by way of example. First, a solvent used for the solution of the copper salt of the aliphatic organic acid is heated to a temperature (e.g., a temperature from 25° C. to 80° C.) that is equal to or lower than the boiling point of the solvent used, and in this state, the copper salt of the aliphatic organic acid is added to the solvent to prepare a solution of the copper salt of the aliphatic organic acid. Next, while the temperature of the copper salt solution is kept at or above the melting point of the copper salt of the aliphatic organic acid, the core particles in a dry state or a slurry containing the core particles is added to the solution of the copper salt of the aliphatic organic acid and then stirred for 1 hour to thereby apply surface treatment to the surface of the core particles. In the resulting copper particles obtained using this method, a coating layer made of the copper salt of the aliphatic organic acid is formed on the surface of the core particles made of copper. In the case where surface treatment is performed using a slurry containing the core particles, it is preferable that the slurry is heated to a temperature that is equal to or higher than the melting point of the copper salt of the aliphatic organic acid, from the viewpoint of uniformly forming the coating layer on the surface of the core particles.

In the surface treatment using the solution of the copper salt of the aliphatic organic acid, the content of the copper salt of the aliphatic organic acid in the reaction solution containing the core particles is preferably from 0.2 to 2.0 parts by mass, and more preferably from 0.5 to 1.5 parts by mass, with respect to 100 parts by mass of the core particles that are not surface-treated. Copper particles surface-treated in the above-described carbon atom ratio can be obtained by performing surface treatment with such an amount.

Examples of the solvent in which the copper salt of the aliphatic organic acid is dissolved include organic solvents such as monohydric alcohols having 1 to 5 carbon atoms, polyhydric alcohols, esters of polyhydric alcohols, ketones, ethers, and the like. Among these, in view of compatibility with water, economy, handleability, and ease of removal, monohydric alcohols having 1 to 5 carbon atoms are preferable, and an aqueous methanol solution, ethanol, n-propanol, or isopropanol is more preferably used.

The copper particles of the present invention obtained through the above-described process are subjected to washing and solid-liquid separation, if necessary, and, after that, the copper particles may be used in the form of a slurry in which they are dispersed in a solvent such as water or an organic solvent, or may be dried and used in the form of a dry powder, which is a collection of the copper particles. In either case, the copper particles of the present invention have excellent low-temperature sinterability while the oxidation of the constituent metal, copper, is suppressed and the aggregation of particles is suppressed. Furthermore, as will be described later, the copper particles of the present invention can also be used in the form of a conductive composition, such as a conductive ink or a conductive paste, in which the copper particles are further dispersed in an organic solvent, a resin, or the like.

When the copper particles of the present invention are used in the form of a conductive composition, the conductive composition contains at least the copper particles and an organic solvent. As the organic solvent, any organic solvents similar to those conventionally used in conductive compositions containing a metal powder can be used without particular limitation. Examples of such organic solvents include monohydric alcohols, polyhydric alcohols, polyhydric alcohol alkyl ethers, polyhydric alcohol aryl ethers, polyethers, esters, nitrogen-containing heterocyclic compounds, amides, amines, and saturated hydrocarbons. One of these organic solvents may be used alone, or two or more thereof may be used in combination. Of these, polyethers such as polyethylene glycol and polypropylene glycol, which have a high reducing effect and prevent unintentional oxidation of the copper particles during sintering, are preferably used. For the same reasons, in the case where polyethylene glycol is used as the organic solvent, the number average molecular weight of polyethylene glycol is preferably from 120 to 400, and more preferably from 180 to 400.

At least one of a dispersant, an organic vehicle, and a glass frit may be further added to the conductive composition of the present invention, if necessary. Examples of the dispersant include dispersants such as nonionic surfactants that do not contain sodium, calcium, phosphorus, sulfur, chlorine, and the like. Examples of the organic vehicle include mixtures containing a resin component such as an acrylic resin, an epoxy resin, ethyl cellulose, carboxyethyl cellulose, or the like and a solvent such as a terpene-based solvent such as terpineol or dihydroterpineol, an ether-based solvent such as ethyl carbitol or butyl carbitol, or the like. Examples of the glass frit include borosilicate glass, barium borosilicate glass, and zinc borosilicate glass.

A conductor film containing copper can be formed by applying the conductive composition of the present invention to a substrate to form a coating film and heating and sintering the coating film. The conductor film can be suitably used, for example, to form a circuit of a printed wiring board or establish electrical continuity of an external electrode of a ceramic capacitor. For example, a printed-circuit board made of a heat-resistant polyethylene terephthalate resin, a glass epoxy resin, or the like or a flexible printed-circuit board made of polyimide or the like can be used as the substrate, according to the type of an electronic circuit in which the copper particles are used.

The amounts of the copper particles and the organic solvent in the conductive composition of the present invention can be adjusted according to the specific use of the conductive composition and the method for applying the conductive composition, but the copper particle content in the conductive composition is preferably from 5 to 95 mass %, and more preferably from 80 to 90 mass %. For example, inkjet printing, dispensing, microdispensing, photogravure printing, screen printing, dip coating, spin coating, spray coating, bar coating, roll coating, and the like can be used as the application method.

It is sufficient that the heating temperature at which the formed coating film is sintered is not lower than the sintering start temperature of the copper particles, and, for example, the heating temperature may be from 150° C. to 220° C. The atmosphere during heating may be, for example, an oxidizing atmosphere or a non-oxidizing atmosphere. An example of the oxidizing atmosphere is an oxygen-containing atmosphere. Examples of the non-oxidizing atmosphere include a reducing atmosphere such as hydrogen or carbon monoxide, a weakly reducing atmosphere such as a hydrogen-nitrogen mixed atmosphere, and an inert atmosphere such as argon, neon, helium, and nitrogen. Regardless of which atmosphere is used, the heating time is preferably from 1 minute to 3 hours, and more preferably from 3 minutes to 2 hours, provided that heating is performed in the above-described temperature range.

Since the resulting conductor film is obtained by sintering the copper particles of the present invention, even when sintering is performed under the conditions of a relatively low temperature, sintering can be proceeded sufficiently. Also, since the copper particles are melted even at a low temperature during sintering, the contact area between the copper particles or between the copper particles and the surface of a base material can be increased, and as a result, a sintered structure that has high adhesion to a bonding target and high density can be formed efficiently. Furthermore, the resulting conductor film has high conduction reliability.

EXAMPLES

Hereinafter, the present invention will be described in greater detail using examples. However, the scope of the present invention is not limited to the examples below.

Example 1

A slurry in which spherical core particles (copper: 100 mass %) with no surface treatment agent applied were dispersed in water was produced in accordance with the method disclosed in Example 1 of JP 2015-168878A. This slurry was washed by rotary filtering at 25° C. for 30 minutes, and thus, a slurry of washed core particles was obtained. The conductivity after washing was 1.0 mS, and the amount of the core particles made of copper contained in the slurry was 1000 g (10 mass %).

Next, the slurry of the washed core particles was heated to 50° C., and in this state, a solution in which 17 g of copper(II) laurate was dissolved in 4 L of isopropyl alcohol was instantaneously added as a surface treatment agent, and the mixture was stirred at 50° C. for 1 hour. After that, solid-liquid separation was performed by filtration, and thus, copper particles in which a coating layer of the copper salt of the aliphatic organic acid was formed on the surface of the core particles was obtained as a solid. The content of the surface treatment agent in the obtained copper particles was 0.7 mass % in terms of carbon atoms. The primary particle size of the copper particles was 0.14 μm.

Example 2

Copper particles were obtained in a similar manner to that of Example 1, except that a solution in which 13 g of copper(II) caprylate was dissolved in 4 L of isopropyl alcohol was added as the solution of a copper salt of an aliphatic organic acid. The content of the surface treatment agent in the obtained copper particles was 0.6 mass % in terms of carbon atoms. The primary particle size of the copper particles was 0.14 μm.

Example 3

Copper particles were obtained in a similar manner to that of Example 1, except that a solution in which 23 g of copper(II) stearate was dissolved in 4 L of isopropyl alcohol was added as the solution of a copper salt of an aliphatic organic acid. The content of the surface treatment agent in the obtained copper particles was 0.7 mass % in terms of carbon atoms. The primary particle size of the copper particles was 0.14 μm.

Example 4

Copper particles were obtained in a similar manner to that of Example 1, except that a solution in which 23 g of copper(II) oleate was dissolved in 4 L of isopropyl alcohol was added as the solution of a copper salt of an aliphatic organic acid. The content of the surface treatment agent in the obtained copper particles was 0.7 mass % in terms of carbon atoms. The primary particle size of the copper particles was 0.14 μm.

Comparative Example 1

Instead of a copper salt of an aliphatic organic acid, a solution of lauric acid, which is an aliphatic organic acid, was used as the surface treatment agent. The lauric acid solution was prepared by dissolving 13 g of lauric acid in 1 L of methanol. Other procedures and conditions were similar to those of Example 1, and thus, copper particles in which a coating layer of the aliphatic organic acid was formed on the surface of the core particles were obtained. The content of the surface treatment agent in the obtained copper particles was 0.7 mass % in terms of carbon atoms. The primary particle size of the copper particles was 0.14 μm.

Evaluation of Sinterability

The copper particles of the examples and the comparative example were sintered, and their sinterability was evaluated. More specifically, 8.5 g of the copper particles of each of the examples and the comparative example and polyethylene glycol having a number average molecular weight of 200 were mixed using a three-roll kneader, and thus, a conductive paste containing 85 mass % copper particles was obtained. The obtained paste was applied to a glass substrate, and the substrate was fired in a nitrogen atmosphere at 190° C. for 10 minutes to sinter the paste, thereby forming a conductor film on the glass substrate. The degree of fusing between the sintered copper particles in the conductor film was observed using an electron microscope, and the sinterability was evaluated based on the following evaluation criteria. Table 1 below shows the results.

Evaluation Criteria for Sinterability

A: Excellent sinterability; particles are fused to each other, and necking is observed between particles.

B: Poor sinterability; particles are not fused to each other.

Evaluation of Resistivity of Conductor Film

The resistivity of each conductor film formed in "Evaluation of Sinterability" above was measured using a resistivity meter (Loresta-GP MCP-T610, manufactured by Mitsubishi Chemical Analytech Co., Ltd.). The measurement was performed three times for each conductor film to be measured, and the arithmetic mean value of the measured values was used as the resistivity (Ω·cm) of that conductor film. The lower the resistivity, the lower the resistance of the conductor film. Table 1 below shows the results.

Evaluation of Temperature at 10% Mass Loss

In a thermogravimetric analysis when the copper particles were heated from 25° C. to 1000° C., the temperature at which the ratio of the mass loss value to the mass loss value at 500° C. reached 10% was measured under the above-described conditions. Table 1 shows the results.

Evaluation of Infrared Absorption Peak

Figure 2:
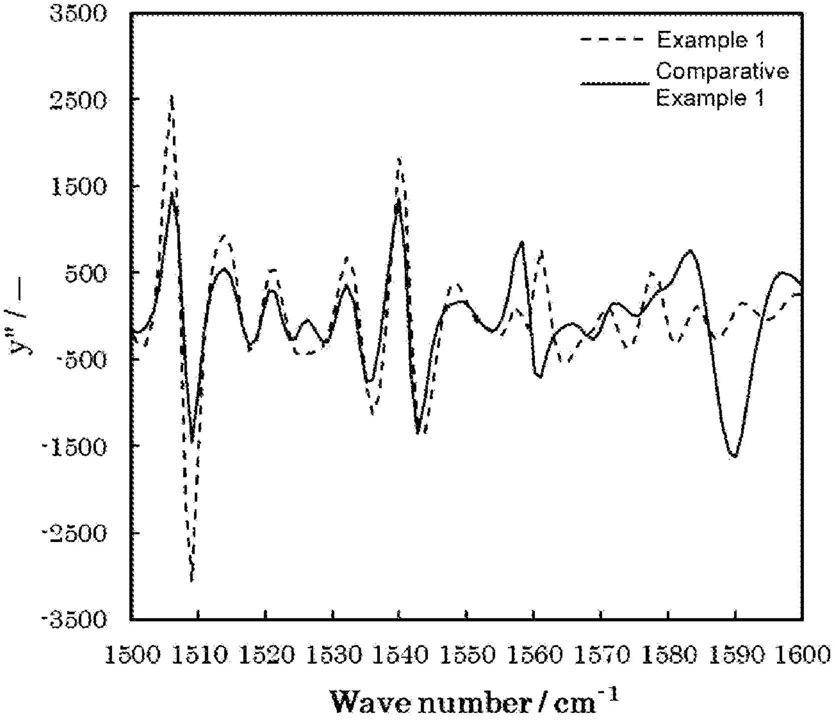
FIG. 2 is a graph showing the IR spectra of Example 1 and Comparative Example 1 in FIG. 1 after being differentiated twice.

The copper particles of the examples and the comparative example were subjected to measurement by infrared spectroscopy using the above-described method. In a range of 1504 to 1514 $cm^{-1}$ and a range of 1584 to 1596 $cm^{-1}$, independently, if an infrared absorption peak was observed, this was indicated by "Yes", and if no infrared absorption peak was observed, this was indicated by "No". Table 1 and FIGS. 1 and 2 show the results.

Evaluation of Adhesion to Resin Plate

Coating and sintering were performed in a similar manner to that described in "Evaluation of Sinterability" above, except that a heat-resistant PET film (Lumirror X10S with a melting point of 260° C., manufactured by TORAY Industries Ltd., hereinafter also referred to as "PET film") was used instead of the glass substrate. Thus, a structure in which a conductor film was formed on the PET film was obtained. Next, the obtained structure was placed in a 100-mL beaker containing 50 mL of methanol, and the structure in the beaker was irradiated with ultrasonic waves at 200 W and 38 kHz for 1 minute using an ultrasonic bath (SONO CLEANER 200D, manufactured by Kaijo Corporation). The condition of the irradiated structure was evaluated based on the following criteria. Table 1 below shows the results.

Evaluation Criteria for Adhesion

A: Good adhesion; peeling of the conductor film from the PET film is not observed.

B: Poor adhesion; peeling of the conductor film from the PET film is observed, or the conductor film is broken.

As shown in Table 1, compared with the copper particles of the comparative example, the copper particles of the examples exhibited superior sinterability at a low temperature, and it can be seen that the conductor films obtained by sintering these copper particles had sufficiently low resistance. Furthermore, it can also be seen that the obtained conductor films had high adhesion to another member such as a resin and therefore had excellent handleability.

In addition, as shown in Table 1 and FIG. 1, the copper particles of all of the examples did not have an infrared absorption peak observed in the range of 1584 to 1596 $cm^{-1}$, whereas the copper particles of the comparative example had an infrared absorption peak observed in this range. An infrared absorption peak in the range of 1504 to 1514 $cm^{-1}$ was observed with respect to the copper particles of both the examples and the comparative example. As shown in FIG. 2, this is also supported by twice-differentiated IR spectra of Example 1 and Comparative Example 1.

Note that peaks protruding downward in the graph in FIG. 2 mean that peaks in the IR spectra in FIG. 1 have peaks protruding upward, and the greater the amplitude in FIG. 2, the greater the peak sharpness in FIG. 1.

Industrial Applicability

According to the present invention, copper particles having excellent low-temperature sinterability are provided.

The invention claimed is:

1. Copper particles each comprising a core particle made of copper and a coating layer that coats a surface of the core particle, wherein the coating layer comprises a surface treatment agent containing a copper salt of an aliphatic organic acid, an average particle size of primary particles of the copper particles is in a range of 0.05 μm to 1.0 μm, and the copper particles have an infrared absorption peak in a range of 1504 to 1514 $cm^{-1}$ and no infrared absorption peak in a range of 1584 to 1596 $cm^{-1}$.

2. The copper particles according to claim 1, wherein the coating layer is made of a copper salt of an aliphatic organic acid.

TABLE 1

| | Surface treatment agent | | Evaluation of copper particles | | | Evaluation of conductor film | | |
|---|---|---|---|---|---|---|---|---|
| | Type | Amount added [mass %] | Temperature at 10% mass loss [° C.] | Whether or not infrared absorption peak was observed: 1504-1514 $cm^{-1}$ | Whether or not infrared absorption peak was observed: 1584-1596 $cm^{-1}$ | Sinterability | Resistivity [μΩ · cm] | Adhesion to resin |
| Ex. 1 | Copper laurate | 1.7 | 188 | Yes | No | A | 50 | A |
| Ex. 2 | Copper caprylate | 1.3 | 220 | Yes | No | A | 170 | A |
| Ex. 3 | Copper stearate | 2.3 | 202 | Yes | No | A | 330 | A |
| Ex. 4 | Copper oleate | 2.3 | 220 | Yes | No | A | 210 | A |
| Com. Ex. 1 | Lauric acid | 1.3 | 247 | Yes | Yes | B | N/A | B |

3. The copper particles according to claim 1, wherein, in thermogravimetric analysis, a temperature at which a ratio of a mass loss value to the mass loss value at 500° C. reaches 10% is from 150° C. to 220° C.

4. The copper particles according to claim 1, wherein the aliphatic organic acid has 6 to 18 carbon atoms.

5. The copper particles according to claim 1, wherein an amount of the surface treatment agent, which is coated on the surface of the core particle, is in a range of 0.2 mass % to 2.0 mass %, and the amount is expressed as a ratio (mass %) of an entirety of the surface treatment agent, which is coated on the surface of the core particle, to the copper particles to which the surface treatment agent is applied.

6. The copper particles according to claim 1, wherein the copper particles have a circularity coefficient of 0.85 or greater.

7. The copper particles according to claim 1, wherein the copper salt of the aliphatic organic acid is copper laurate, copper caprylate, or copper oleate.

8. A method for producing copper particles according to claim 1, comprising bringing core particles made of copper into contact with a solution containing a copper salt of an aliphatic organic acid to thereby coat a surface of the core particles.

9. The method according to claim 8, wherein the solution includes a surface treatment agent containing the copper salt of the aliphatic organic acid, an amount of the surface treatment agent, which is coated on the surface of the core particle, is in a range of 0.2 mass % to 2.0 mass %, and the amount is expressed as a ratio (mass %) of an entirety of the surface treatment agent, which is coated on the surface of the core particle, to the copper particles to which the surface treatment agent is applied.

10. The method according to claim 8, wherein the copper particles have a circularity coefficient of 0.85 or greater.

11. The method according to claim 8, wherein the copper salt of the aliphatic organic acid is copper laurate, copper caprylate, or copper oleate.

12. A method for producing a conductor film, comprising applying a conductive composition containing the copper particles according to claim 1 and an organic solvent to a substrate to form a coating film, and heating the coating film.

* * * * *